(No Model.) 8 Sheets—Sheet 3.
T. J. THORP.
ELEVATOR.
No. 465,587. Patented Dec. 22, 1891.
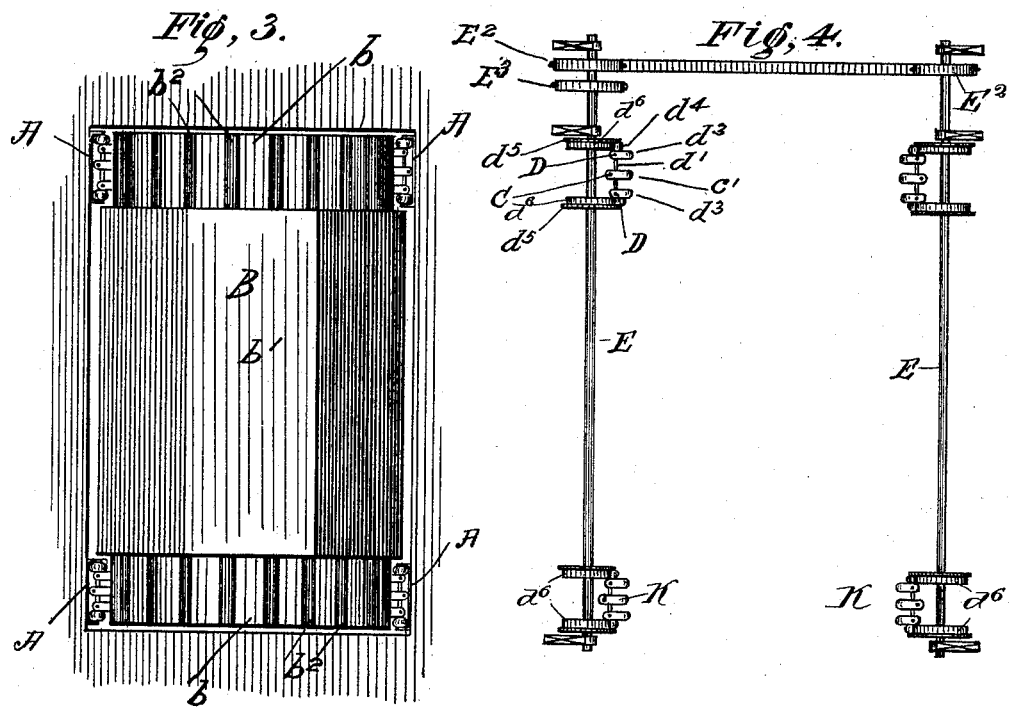
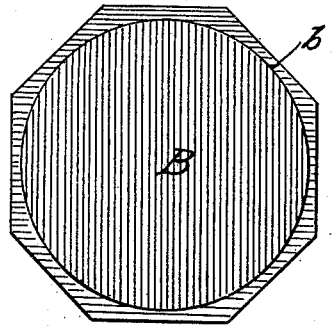
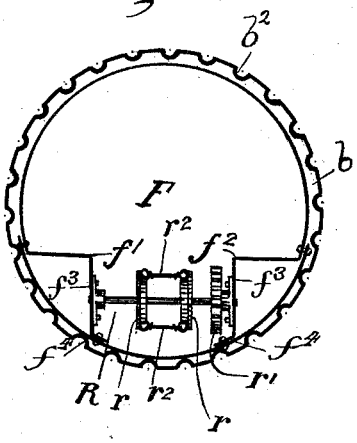
Witnesses
Samuel J. Nilsson,
H. White
Inventor
Thomas J. Thorp,
By Dyrenforth and Dyrenforth,
Att'ys

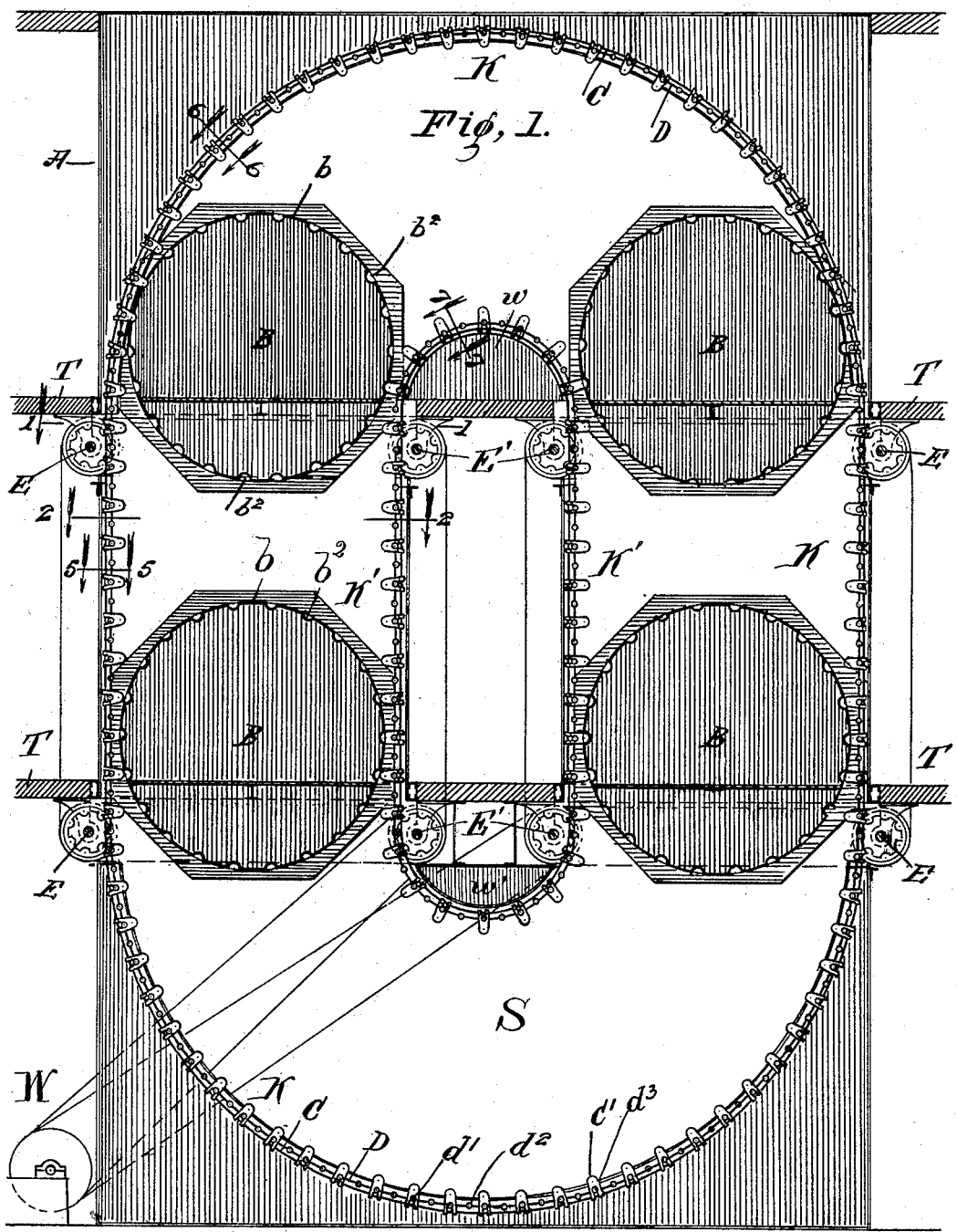

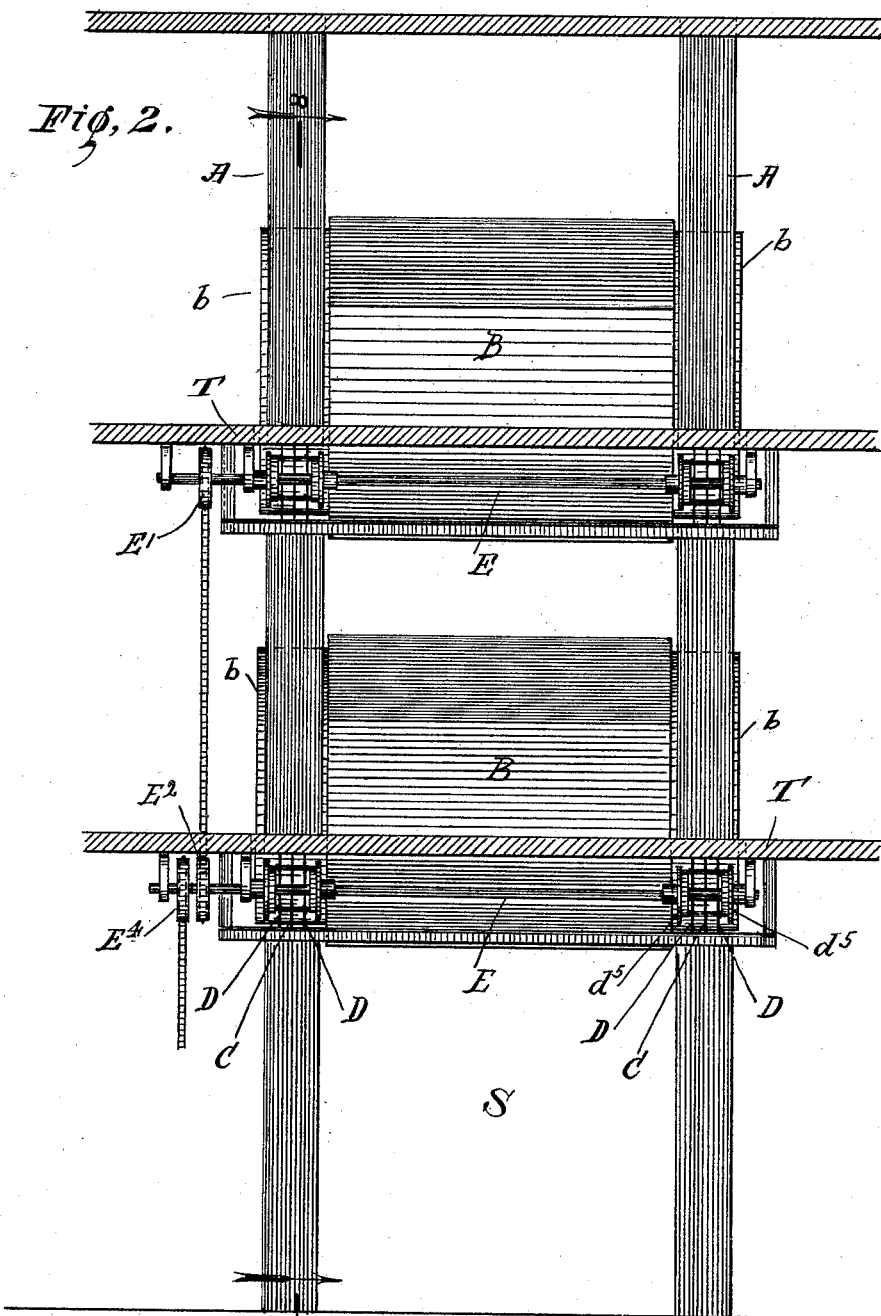

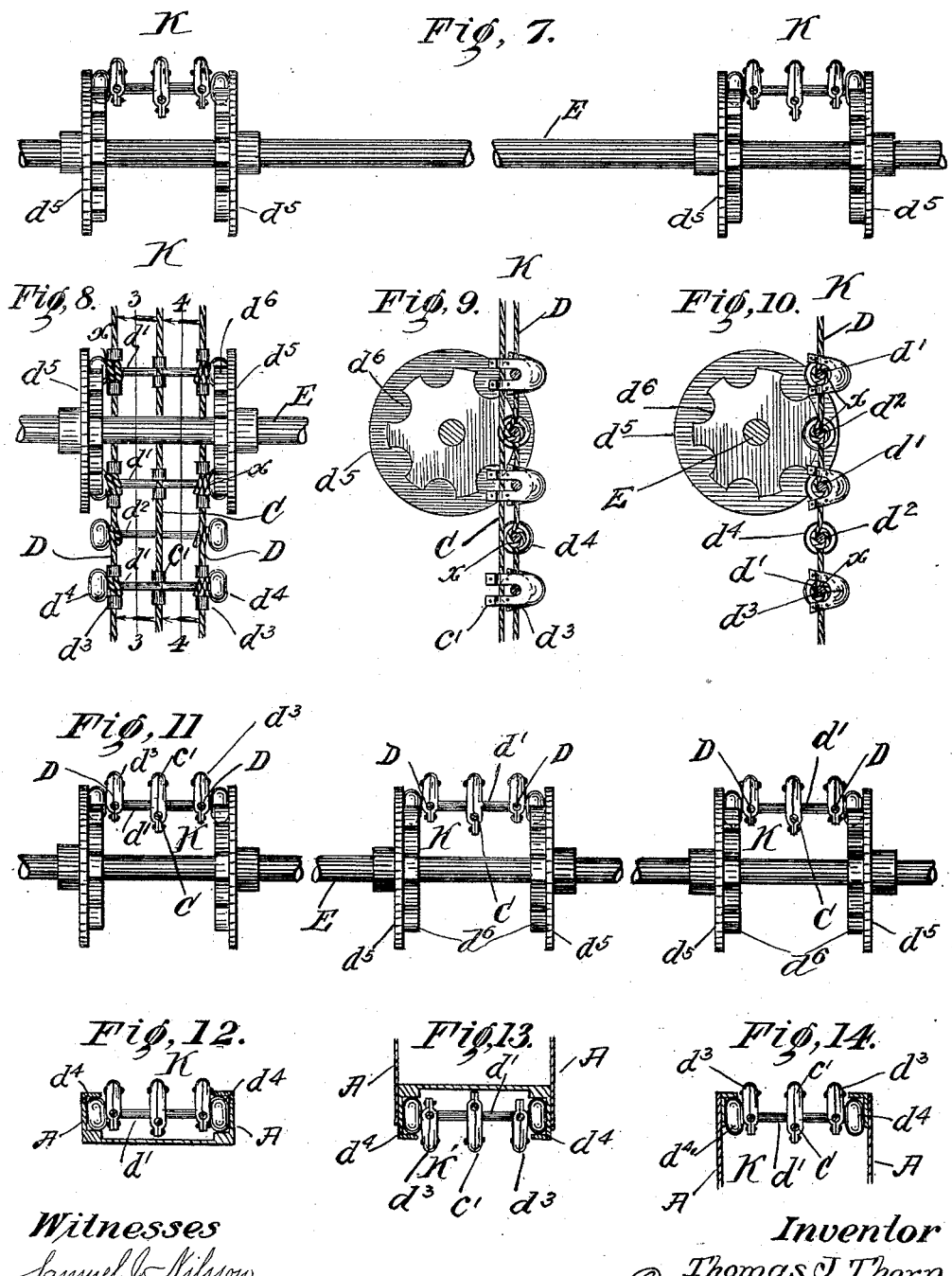

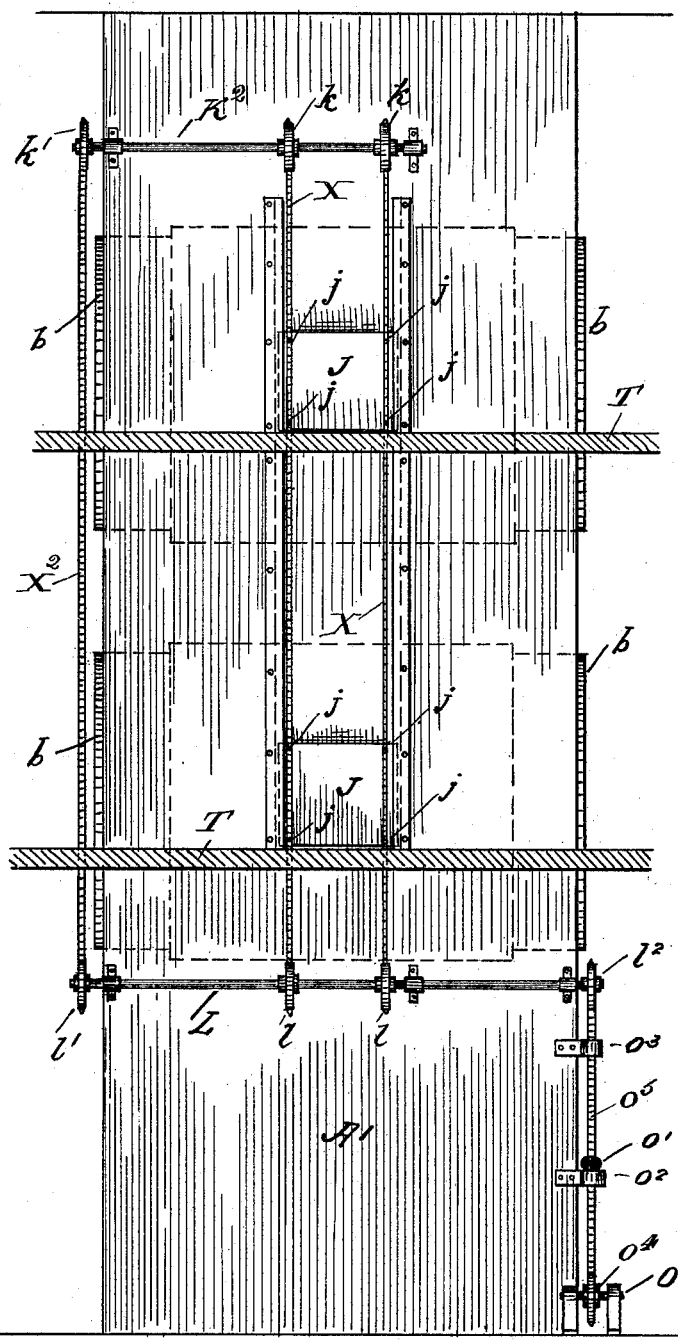

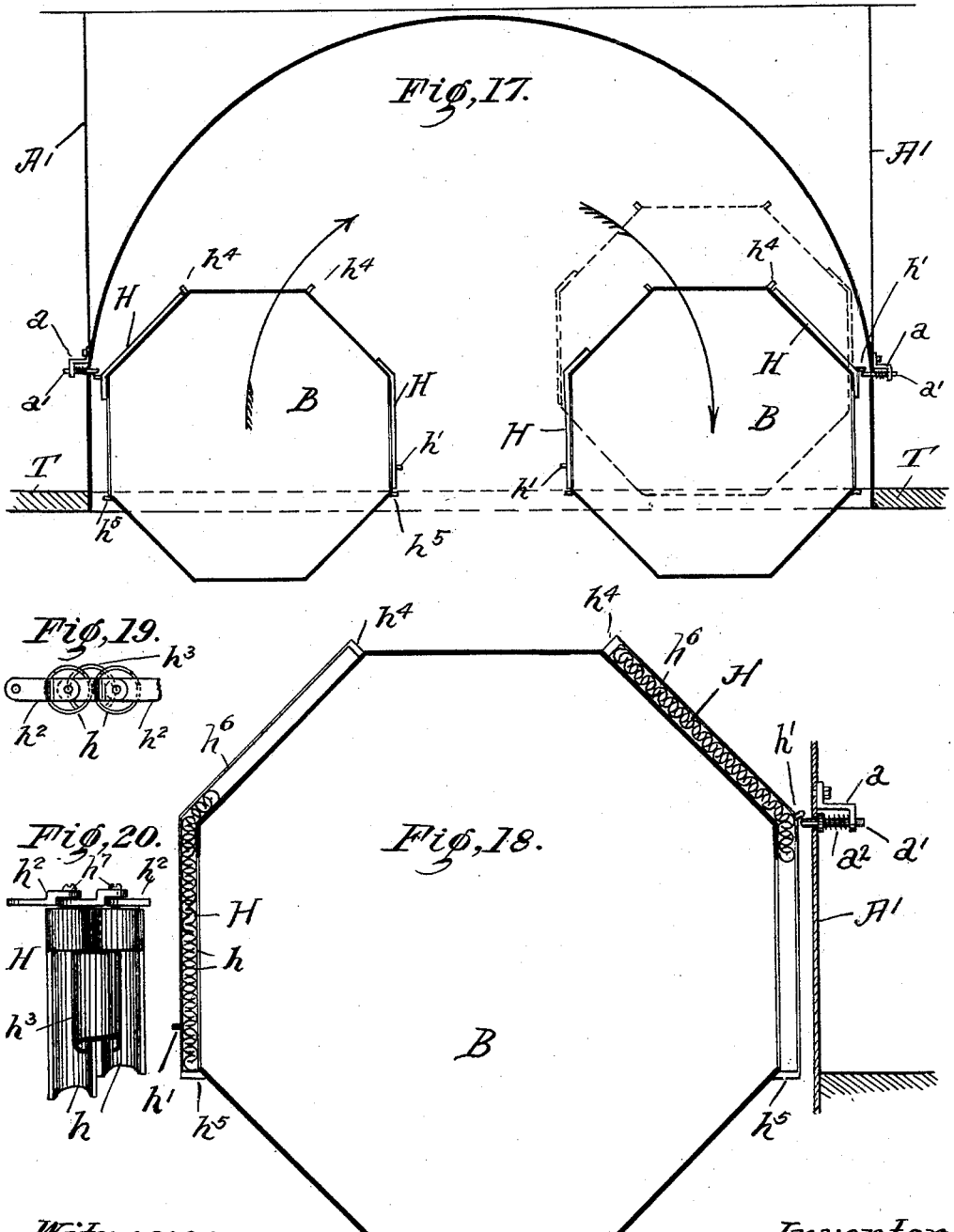

(No Model.) 8 Sheets—Sheet 8.

T. J. THORP.
ELEVATOR.

No. 465,587. Patented Dec. 22, 1891.

Witnesses
Samuel J. Nilsson,
H. White

Inventor
Thomas J. Thorp,
By Dyrenforth and Dyrenforth
Att'ys

UNITED STATES PATENT OFFICE.

THOMAS J. THORP, OF CHICAGO, ILLINOIS.

ELEVATOR.

SPECIFICATION forming part of Letters Patent No. 465,587, dated December 22, 1891.

Application filed July 13, 1891. Serial No. 399,311. (No model.)

*To all whom it may concern:*

Be it known that I, THOMAS J. THORP, a citizen of the United States, residing at Chicago, in the county of Cook and State of Illinois, have invented a new and useful Improvement in Elevators, of which the following is a specification.

My invention relates to an improvement in the class of elevators for passenger and freight service. I design it for use either exclusively for carrying passengers in buildings, or both passengers and freight, or exclusively freight, my improvement being adaptable, in connection with the last-named purpose, for even the heaviest kind of service, such as moving loaded and unloaded railway freight-cars to and from different stories in a suitable building.

The primary feature in the construction forming my improvement involves the plan of operation of the traveling endless cable system of surface-railway cars adapted for elevator service by applying it in a manner to cause the endless cable to travel vertically in an elevator-shaft and carry a single car or any desired number of cars through a circuitous route in the shaft to the different floors intersected by it.

Among the advantages incidental to my improvement may be mentioned those due to the employment of a number of cars on the endless carrier at intervals apart, causing them all to be brought simultaneously coincident with a floor at opposite sides of the elevator-shaft or with different floors, whereby the cars may all be controlled from a single point, as by the engineer, from the operating-engine for starting them and for stopping them to take on and let off passengers and freight. Thus the convenience of the use of elevators may be enhanced and the common annoyance of long waiting avoided, besides overcoming the requirement for an attendant inside each car, reducing the liability of accident, and economizing by the use of one instead of a multiple number of elevator-shafts for any increase in the elevator-service capacity.

My invention consists in the general plan of construction of my improvement.

It also consists in details of construction and combinations of parts hereinafter described, and set forth in the claims.

Figure 15:
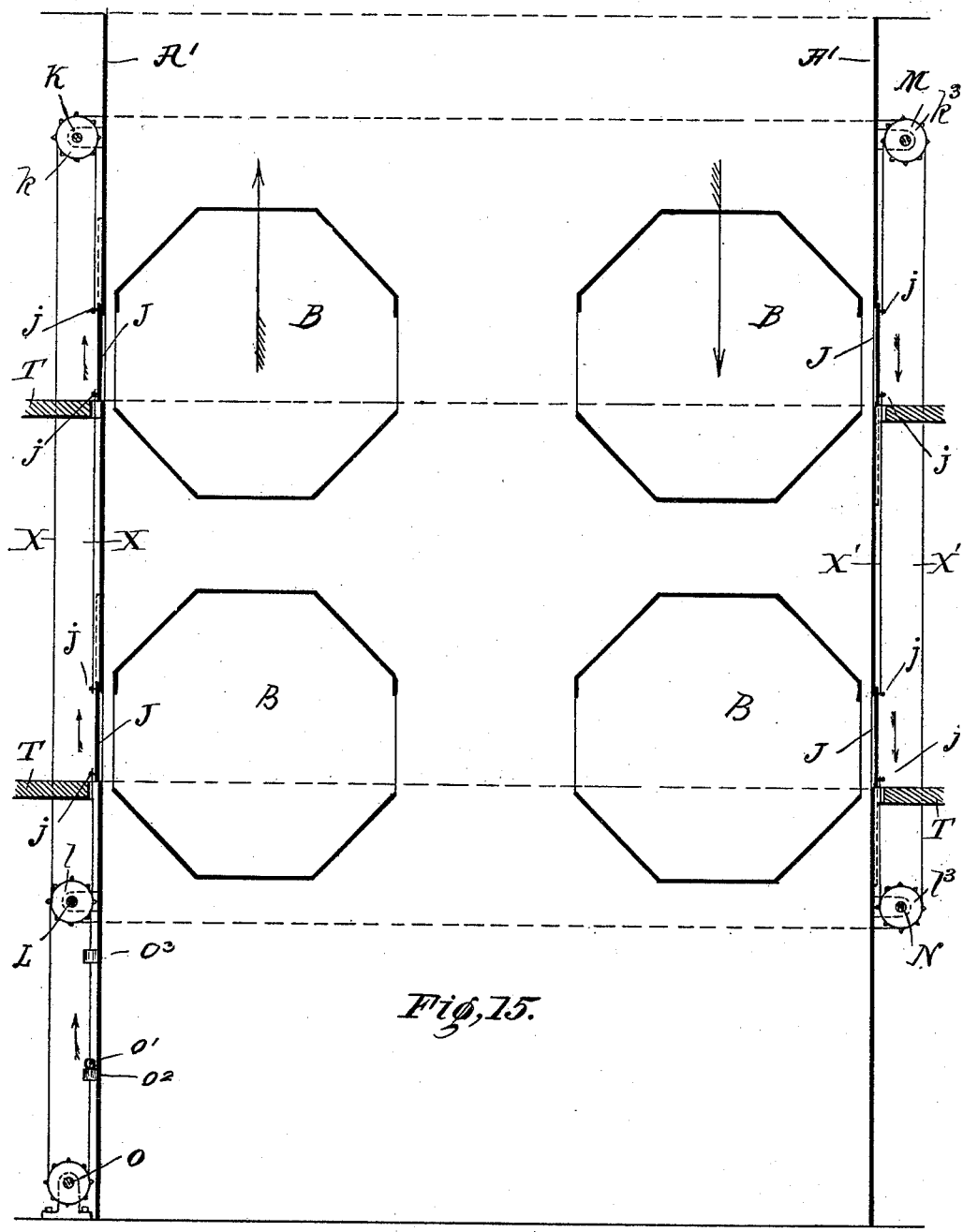
Figure 21:
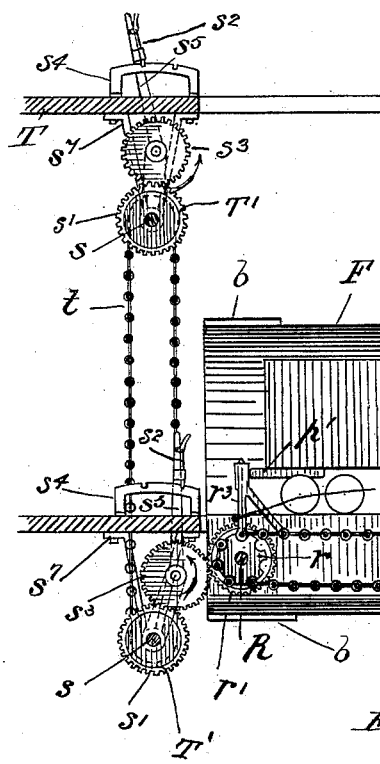
Figure 22:
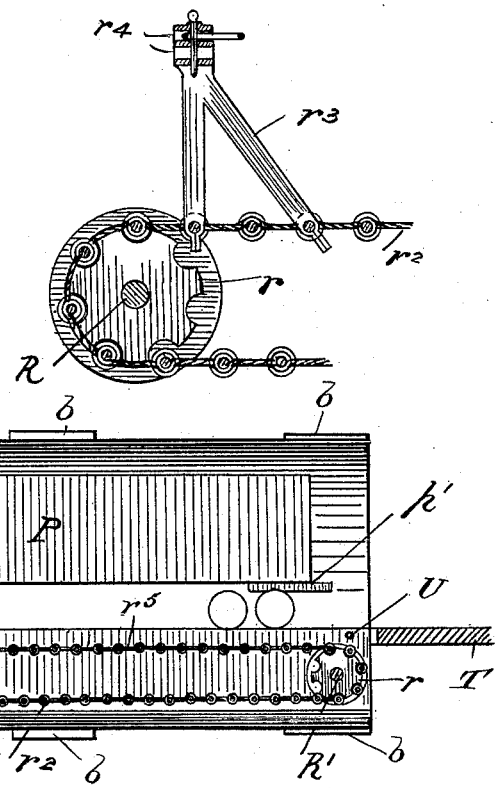
Figure 23:
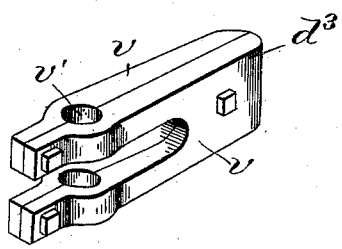

In the accompanying drawings, Figure 1 is a view in sectional elevation in the nature of a diagram, showing my improved elevator system, with the cars adapted especially for carrying passengers in an elevator-shaft, the section being taken at the line 8 8 on Fig. 2. Fig. 2 is a view of the same in front elevation, with the floors intersected by the elevator-shaft, shown in section. Fig. 3 is a plan section on the line 2 2 of Fig. 1 and enlarged. Fig. 4 is a plan sectional view through the cables and showing their operating-gears and connections, the section being taken at the line 1 1 on Fig. 1, but with all other details of the system removed. Fig. 5 is a view in end elevation of a passenger-car. Fig. 6 is a similar view of a freight-car. Fig. 7 is a broken plan view showing one of the rotary driving-shafts and the connections adapting it for use in driving a passenger-car. Fig. 8 is a broken view of the same, showing the cables and their connections and driving-gear in elevation. Fig. 9 is a section through the aforesaid driving-shaft, taken at the line 4 4 on Fig. 8 and enlarged. Fig. 10 is a similar view of the same, taken at the line 3 3 on Fig. 8. Fig. 11 is a broken plan view showing a rotary driving-shaft and the connections adapting it for heavy-freight service. Figs. 12, 13, and 14 are sectional views taken, respectively, at the lines 5 5, 7 7, and 6 6 on Fig. 1 and enlarged. Fig. 15 is a vertical sectional view in the nature of a diagram through the elevator-shaft transversely of the cars and illustrating the working of the elevator-shaft doors. Fig. 16 is a view showing the elevator-shaft and illustrating the frame-doors thereof and the mechanism for working them in elevation. Fig. 17 is a section taken transversely through two cars in the upper portion of the elevator-shaft and illustrating the automatic working of the car-doors. Fig. 18 is an enlarged transverse section of a passenger-car, representing the outline thereof and the construction of the car-door and stop mechanism for operating it. Fig. 19 is a broken end view, and Fig. 20 a broken plan view, of a portion of the car-door, showing the construction whereby it is rendered flexible. Fig. 21 is a broken view representing a freight-elevator car in longitudinal section in the elevator-shaft and mechanism for working a horizontal endless chain under a railway freight-car for moving the latter into and out of the elevator-car. Fig. 22 is a broken sectional view showing the aforesaid horizontal chain-and-coupler connection for the railway freight-car. Fig. 23 is a perspective view of the stirrup detail.

Arrows at section-lines in the details indicate the directions of regarding the latter.

S, Fig. 1, denotes the vertical elevator-shaft of the elevator system. The upper and lower ends of the shaft S are preferably arched, as shown, while the sides (which would ordinarily intersect more than the two floors represented in Fig. 1) are straight and provided with guard-frames A', (see Fig. 15,) containing at the floors T openings provided with vertically-sliding doors J, adapted to be opened and closed, as hereinafter described. Endless guide-tracks A, (see particularly Fig. 12,) flanged as shown, are provided to extend vertically entirely around the shaft S in the direction of curvature of the arched upper and lower ends, one at each side of the shaft, laterally of the planes of the doors J. In these guide-tracks are confined the endless operating cable-chains K, the details of the construction of which are most clearly represented in Figs. 8 to 10, inclusive. Generally stated, each cable-chain K is formed with three parallel cables D, C, and D, the outer ones serving for continual or regular use, while the intermediate one is more for safety purposes. At intervals along the cables D, C, and D and extending transversely between them are the alternating connecting-bars $d'$ and $d^2$, each carrying roller-heads $d^4$, affording bearings loose upon its opposite extremities, the bars being firmly secured in place upon the extreme cables D D by passing or "hitching" each of the latter, as by a halfhitch $x$, around the bar, near its heads $d^4$, and extending each cable above and below the half-hitch $x$ through a stirrup $d^3$ of peculiar construction. All the stirrups $d^3$, of which many are employed, involve the construction of that represented on a larger scale and most clearly in Fig. 23. I form the stirrup in two similar halves $v$ $v$, each being rounded toward one (the gear-engaging) end and bifurcated toward its opposite end, the two parts being bolted flatwise together and forming between them an opening $v'$ for the passage through the stirrup of a cable D or C. Each bar $d'$ is embraced by the bifurcated ends of three stirrups, of which the intermediate one (denoted as $c'$) for the safety-cable C, which need not be secured to the bars $d^2$ by a halfhitch $x$, should be the larger, the several cables, passing through the stirrup-holes $v'$, thus caused to extend at one (the outer) side of the bars in the cable-chain K and having the stirrups clamped against their irregular surfaces by the bolts. It will also be noticed that the cable C merely passes each alternate bar $d^2$, the latter being unprovided with a stirrup $c'$. A cable-chain K of the construction thus described in detail lies within a guide-track A, extending entirely around the inside of the shaft S at each side of the dooropenings in the guard-frames A'. The inner rounded ends of the stirrups project into the shaft S to engage recesses $b^2$, provided at intervals apart corresponding with those of the bars $d'$ and $d^2$ in the perimeters of rigid circular heads $b$ on the opposite ends of each passenger-car B and freight-car F, hereinafter described.

In the central part of the shaft S is supported an endless cable-chain K', constructed in every particular exactly like the cablechain K, being only shorter than the latter. It is supported on arc-shaped stationary bearings $w$ and $w'$, respectively above the plane of the uppermost and below that of the lowermost of the floors T, and in an endless guide-track A, like that already described, extending about the two said bearings. The relative positions of the cable-chains K and K' are such that the space between them in a right line at any point in the shaft S is the same and of a width to accommodate cars B or F in a manner to produce engagement with the recesses $b^2$ in the heads $b$ on the ends of the cars of the cable-chain stirrups $d^3$ and $c'$ in the order that the latter reach them in the travel of the cable-chains.

A desirable form for the passenger-cars B is that illustrated of an octagon between the circular heads $b$, though I do not limit my improvement to any particular construction of car, whether for passenger service or exclusively for freight, though for the last-named purpose the construction of the car F (represented in end elevation and by an outline in Fig. 6) is preferred. It is in the form of a cylinder having open ends, with the shell constructed in two parts, the upper of which turns inward toward its lower edges to produce offsets $f'$ and $f^2$, affording a track for a freight-car P, (see Fig. 21,) hereinafter described, and from the offsets the ends of the edges of the said upper portion of the shell turn vertically downward and form bearings $f^3$ for shafting, also hereinafter described, the edges turning thence inward to afford flanges $f^4$, to which the lower section of the car, completing, with the aforesaid upper section thereof, the cylinder, is bolted, it being further bolted thereto near its edges adjacent to the offsets $f'$ and $f^2$, as shown.

It should here be stated that when the cars F are employed the doors leading into the shaft S at the different floors will be in the shaftwalls at right angles to those illustrated in Fig. 1, in order that the open ends of the car may be presented to them. In other words, the cable-chains K and K' will be arranged to travel in a plane at right angles to that of the doors. Obviously, however, freight-cars may be so constructed as to adapt them to be placed and utilized like the cars B.

For driving the cable-chains K and K', I provide the mechanism represented diagrammatically in Fig. 4. Below the planes of the uppermost and lowermost floors T are provided at opposite sides of the shaft S rotary driving-shafts E, supported in suitable bearings to extend parallel with the length of the cars B. On the same horizontal planes as the shafts E are provided similar shafts E', one for each shaft E, at the inner sides of the cable-chain K'. Each of the said shafts E and E' carries near each of its opposite ends a pair of pinions $d^6$, which by reason of their function, hereinafter described, of engaging the bars carrying the stirrups on the cable-chains I term "stirrup-pinions," the members of each pair being a distance apart corresponding with that between the roller-heads $d^4$ on each transverse bar in the cable-chains. At their outer faces the pinions $d^6$ carry flanges $d^5$ to afford guides, and similar pinions $E^2$ $E^3$ $E^4$ are provided on the shafts for gearing them together and with the driving power. Thus the shafts may be divided into two sets of four each, (or as many each as there are floors in the system,) carrying their respective pinions, one set having two at the left-hand outer side of the cable-chain K and two at the corresponding inner side of the cable-chain K', the other set having two of the shafts (or as many thereof as there are floors) at the right-hand outer side of the chain K and at the corresponding inner side of the chain K, as represented in Fig. 1. The pinions $d^6$ on the shafts protrude through the backs of the respective guide-tracks A, and their peripheral recesses are at intervals apart corresponding with those of the bars of the cable-chains, whereby in rotating they engage the latter successively at their roller-heads. The shafts E and E' are geared, in the sets described, with the driving power, (indicated at W in Fig. 1,) the lowermost shaft E' of each set being directly geared therewith from its pinion $E^4$, (see Fig. 2,) as indicated in Fig. 1, and the others being geared successively one to the other at their gear-pinions $E^2$ $E^3$ to cause the pinions to rotate in contrary directions at opposite sides of the cars.

The operation is as follows: With the cars (as the cars B) in position wherein they are supported between the cable-chains K and K' in the shaft S by the stirrups $d^3$ $c'$, (which by the manner of fastening them in place operate as levers, having their fulcrums on the bars $d'$ $d^2$,) engaging the recesses $b^2$ in the car-heads b, by actuating the driving-shafts the pinions $d^6$ will be properly rotated. These pinions engage the bars $d'$ $d^2$ in the respective endless cable-chains successively, and thereby cause the said chains to travel, with the roller-heads on the said bars revolving on the guide-tracks confining them. The traveling cable-chains engage at their stirrups $d^3$ $c'$ the recesses in the heads b of the cars, thereby supporting the latter and carrying them always in upright position around the elevator-shaft S to and from the several floors T in succession on opposite sides of the elevator-shaft.

While it is within the spirit of my invention to employ only one car supported and actuated in the manner described, the intention is to use at least two, one of which shall always be ascending while the other is descending and at distances apart whereby they shall simultaneously be at a floor or different floors, and it is preferred to provide double the number of cars that there are floors and to have them all stop simultaneously at the floors, entrances to the shaft S being provided at opposite sides thereof, two for each floor, whereby passengers desiring to ascend may enter at one side of the shaft and those desiring to descend may enter at the other side. By thus providing the requisite number of cars the elevator capacity is increased with a single elevator-shaft in a degree adapted to meet all requirements, and there need be no material waiting by passengers to "take the elevator."

As hereinbefore suggested, the elevator system should be controlled from the operating-engine (indicated at W in Fig. 1) to stop all the cars simultaneously at the floors they successively reach and to start them again. Suitable signaling or other means may be adopted and operated for notifying the operator when to start the train.

Provision is made (see Figs. 15 to 20, inclusive) for automatically opening and closing doors in the cars B and opening by hand doors in the guard-frame A'. The openings hereinbefore referred to as being provided in the frames A' at the floors T at opposite sides of the shaft S contain each a vertically-sliding door J, those at one side of the elevator-shaft opening upward and those at the opposite side downward. The doors J are all connected together by means enabling them to be simultaneously operated by hand. At one outer side of the elevator-shaft are supported in suitable bearings, respectively near the lower and upper ends of the said shaft, rotary shafts L and $K^2$, the former carrying a pair of cable-pinions l in vertical line with the doors J near their lateral edges at one side of the elevator-shaft, and the latter carrying a similar pair of cable-pinions k, the members of which align with those of the pair l. Each pinion k is connected with the wheel l directly below it by an endless chain X, fastened to projections j on the doors it passes. At the opposite side of the elevator-shaft are the rotary shafts N and M, (see Fig. 15,) corresponding with and supported like the shafts L and $K^2$ and carrying each a pair of cable-pinions $k^3$ and $l^3$, respectively, connected together, like the pinions l and k, by endless chains X'. The shaft L carries at one end a cable-pinion $l^2$, connected with a similar pinion $o^4$ on a shaft O by an endless chain $o^5$, passing through guides $o^2$ and $o^3$, between which it carries a stop $o'$. At the opposite end of the shaft L it carries a cable-pinion $l'$, connected by an endless chain $X^2$ with a similar pinion $k'$ on the corresponding end of the shaft $K^2$, and, as indicated by dotted lines in Fig. 15, the shafts L and $K^2$ are geared by endless chains from their cable-pinions $l'$ and $k'$, respectively, with corresponding pinions on the shafts N and M. Thus all the doors J, which counterbalance each other on opposite sides of the elevator-shaft, may be simultaneously opened or closed by strain exerted in the proper direction for the purpose upon the chain $o^5$, the movement of the doors being limited by the stop $o'$ between the guides $o^2$ and $o^3$.

Each car B is open at opposite sides to afford a doorway (see particularly Fig. 18) and is provided at opposite sides of each opening with guideways $h^6$, extending over two of the octagonal sides of the car and formed with stops $h^4$ and $h^5$, respectively, at their upper and lower ends. In these guides are confined at their lateral edges flexible doors H. I form the doors H of tubes $h$, (see Fig. 20,) each being cylindrical at its opposite ends and having a longitudinal section removed between the cylindrical ends, and longitudinal sections of tubing $h^3$. The sections $h$ are placed side by side and held together by slipping a tube-section $h^3$ over their adjacent edges, whereby when the door so formed is flexed to a considerable extent the sections will not separate. As guiding means at which to confine the door in its lateral guides $h^6$ I provide links $h^2$, connecting the tube-sections $h$ at pins $h^7$, projecting from their closed ends.

The sliding doors H are intended to be normally open—that is, raised—as represented at the right-hand side in Fig. 18, in which position they may be held by friction in the guides $h^6$, though additional or other suitable means may be provided for holding them open, if desired. It is only required to close the door H of each car while it is passing through the garret or upper end of the shaft S. To accomplish that end, I provide a spring-stop $a'$ in a bracket $a$ on the ascension side of the upper end of the shaft in the path of the door projection $h'$, which strikes the stop when the car passes the uppermost floor, whereby the continued movement of the car effects lowering of the door, the spring of the stop enabling it to yield to let the car pass readily when the door is closed. At the opposite side of the shaft a similar contrivance $a$ $a'$ is provided for automatically opening the door H preparatory to the descent of the car in the shaft.

Freight-elevator cars F are supported and actuated in the same manner as the cars B, (the lower portions of which below their floors may be utilized for carrying freight,) except that if the cars F, which are controlled by three sets of the cable-chains, be constructed like the illustration thereof in the drawings the doors in the elevator-shaft and the cable-chains would have to be on different instead of corresponding sides of the elevator-shaft. The car F has journaled near its opposite ends in the bearings $f^3$ below the plane of the track $f'$ $f^2$, shafts R and R', each carrying a pair of rotary pinions $r$, about which passes an endless chain $r^5$, formed with transversely-headed bars $r^2$ (like the bars $d'$ $d^2$) at equal intervals apart, the heads on the opposite projecting ends of each pin being adapted to enter the peripheral recesses in the pinions by the rotation of the latter, which drives the chain.

To the upper length of the chain $r^5$ is fastened rigidly an upright bracket $r^3$, provided at its upper end with a head $r^4$, adapted to receive the link-and-pin coupling on the draw-bar $p'$ at the end of a freight-car P.

On the upper side of each floor T, preferably at each side (though represented only on one in Fig. 21) of the elevator-shaft S, is supported a rack $s^4$ for holding a spring-pawl $s^2$ on the handle end of a lever $s^5$, extending through the floor and carrying at its lower end a pinion $s^3$, meshing with a pinion $s'$, to which it is linked, as indicated, and which is supported on a rotary shaft $s$, journaled in brackets $s^7$, extending below the floor, and carrying a pulley T'. The pulleys T' on the several shafts $s$ at the different floors serve for connecting the shafts $s$ together by endless chains $t$ from floor to floor, whereby they may all be continuously driven by connection of the lowermost with the driving power. (Not shown.)

When a freight-elevator car F, carrying a freight-car P, reaches a floor T at which it is desired to run out the car P, an operator at that floor turns the lever $s^5$ from the position shown of the uppermost said lever in Fig. 21 to that shown of the lowermost in the same figure, thereby throwing the pinion $s^3$, which is being continuously rotated by engagement with the rotating pinion $s'$, into mesh with a pinion $r'$ on the shaft R. This operates the chain $r^5$, through the medium of the bracket $r^3$, to expel the car P out of the elevator-car F, when the lever $s^2$ is turned back to separate the gear-wheel $s^3$ from the gear-wheel $r'$ to stop the motion of the chain $r^5$, the extent of movement of the bracket $r^3$ being between stops U, at either of which it normally remains. Thus when the car P has been expelled from one end of an elevator-car F in the manner described the bracket $r^3$ thereof will be left at such end ready to have coupled with it a freight-car on some other floor, to be drawn into the elevator-car by properly turning the respective lever $s^2$, stated to be on that side of the shaft S, to actuate the gear $s^3$ it controls to effect rotation of the shaft R' in the direction that will move the endless cable $r^5$ in the direction for drawing the freight car P into the freight-elevator car F.

In the cable-chains K and K' the cables D D are the ones which mainly carry the load normally, it being transferred to the cable C' only in case of breakage of the other two cables, or either of them, and serving, therefore, in the capacity of a safety-cable.

The foregoing description and the drawings set forth my improvement with the details of construction which I believe to be adapted best to serve the purposes for which they are used. I do not, however, wish to be understood as confining my invention to mere details of construction, particularly as those shown and described may in various instances doubtless be modified by those skilled in the art to which my improvement relates. This would not, however, entail departure from my invention, which I intend to claim as broadly and comprehensively as the state of the art will warrant.

What I claim as new, and desire to secure by Letters Patent, is—

1. In an elevator, the combination of an elevator-shaft, endless traveling cable-chains supported to extend vertically in the shaft, respectively, along its longitudinal central portion and near its walls, openings leading into the shaft at different floors, and an elevator-car having heads extending about it and supported at opposite sides of said heads and carried by engagement therewith of the said central and outer cable-chains in an upright position throughout its course in the shaft, substantially as described.

2. In an elevator, the combination of an elevator-shaft having at the floors openings at opposite sides of the said shaft leading into it, endless traveling cable-chains supported to extend vertically in the shaft, respectively, along its longitudinal central portion and near its walls, and elevator-cars having heads extending about them and supported at opposite sides of said heads and carried by engagement thereof of the said central and outer cable-chains at intervals apart corresponding with intervals between said floors and in upright position throughout their course in the shaft, substantially as described.

3. In an elevator, the combination of an elevator-shaft, endless traveling cable-chains extending vertically in the shaft and each formed with cables D, bars at intervals between the cables and about which they are hitched, and stirrups on the bars and through which the cables extend, and one or more elevator-cars having recesses $b^2$ engaged by the stirrups successively in the movement of the traveling chains, the bars being thereby supported and carried by the cable-chains, substantially as described.

4. In an elevator, the combination of an elevator-shaft, endless traveling cable-chains extending vertically in the shaft and each formed with cables D D and an intermediate cable C, bars $d'$, carrying stirrups $d^3$, through which the said cables extend, and bars $d^2$, alternating with the bars $d'$, the cables D being hitched about the said bars, and one or more elevator-cars engaged by the stirrups and thereby supported on and carried by the cable-chains, substantially as described.

5. In an elevator, the combination of an elevator-shaft S, endless guide-tracks A, supported to extend vertically in the shaft along the sides thereof and at its center, endless traveling cable-chains K and K', confined, respectively, in the said side and central guide-tracks and each being formed with cables D, bars at intervals between the cables and about which they are hitched and carrying loosely at their opposite ends roller-heads $d^4$, and stirrups $d^3$ on the bars and through which the cables extend, and one or more elevator-cars engaged by the stirrups and thereby supported on and carried between the cable-chains K and K', substantially as described.

6. In an elevator, the combination of an elevator-shaft S, endless guide-tracks A, supported to extend vertically in the shaft along the sides thereof and at its center, endless traveling cable-chains K and K', confined, respectively, in the said side and central guide-tracks and each comprising cables D D and an intermediate cable C, bars $d'$, carrying stirrups $d^3$ and $c'$, through which the said cables extend, and bars $d^2$, alternating with the bars $d'$, the said bars carrying loosely at their opposite ends roller-heads $d^4$ and the cables D being hitched about the said bars, and one or more elevator-cars provided with heads $b$ near their opposite ends and having recesses $b^2$, into which the stirrups on the cable-chains K and K' enter and support and carry the said car or cars, substantially as described.

7. In an elevator, the combination of an elevator-shaft S, endless guide-tracks A, supported to extend vertically in the shaft along the sides thereof and at its center, endless cable-chains K and K', confined, respectively, in the said side and central guide-tracks, one or more elevator-cars supported by and carried between the cable-chains K and K', driving-shafts E at different floors, carrying pinions engaging the cable-chains K to support and drive them and geared together and with the driving power, and driving-shafts E' at different floors, carrying pinions engaging the cable-chains K' to support and drive them and geared together and with the driving power, substantially as described.

8. In an elevator, the combination of an elevator-shaft S, endless guide-tracks A, supported to extend vertically in the shaft along the sides thereof and at its center, endless cable-chains K and K', confined, respectively, in the said side and central guide-tracks, and each comprising cables D D and an intermediate cable C, bars $d'$, carrying stirrups $d^3$ and $c'$, through which the said cables extend, and bars $d^2$, alternating with the bars $d'$, the said bars carrying loosely at their opposite ends roller-heads $d^4$ and the cables D being hitched about the said bars, one or more elevator-cars provided each at its opposite ends with heads $b$, having recesses $b^2$, into which the stirrups of the cable-chains K and K' enter and support and carry the said car or cars, driving-shafts E at different floors, carrying pinions $d^6$, engaging the cable-chains K at their said bars to support and drive the said chains and geared together and with the driving power, and driving-shafts E' at different floors, carrying pinions $d^6$, engaging the cable-chains K' at their said bars to support and drive the said chains and geared together and with the driving power, substantially as described.

9. In an elevator, the combination of a shaft S, having a guard-frame A at opposite sides, provided with door-openings at the floors in opposite sides of the shaft, an endless series of elevator-cars simultaneously movable in the shaft to and from the said openings, and vertically-sliding doors J in the said openings working in contrary directions and connected together to counterbalance each other and to be operated simultaneously from a single point, substantially as described.

10. In an elevator having a shaft S, containing endless traveling cable-chains extending vertically in the shaft and one or more elevator-cars supported on and carried by the said cable-chains, and an elevator-car B, having a flexible door H, comprising the connected tubular sections $h$ and $h^3$, supported in guides $h^6$ at the opposite sides of the door-opening in the car, substantially as described.

11. In an elevator having a shaft S, containing endless traveling cable-chains extending vertically in the shaft and one or more elevator-cars supported on and carried by the said cable-chains, an elevator-car B, having at opposite sides flexible doors H, each comprising the connected tubular sections $h$ and $h^3$, supported in guides $h^6$ at the opposite sides of the door-opening in the car, a projection $h'$ on each door, and spring-stops in the upper portion and at opposite sides of the elevator-shaft in the path of the projections $h'$ on the said doors, substantially as and for the purpose set forth.

12. In an elevator having a shaft S, containing endless traveling cable-chains extending vertically in the shaft and one or more elevator-cars supported on and carried by the said cable-chains, an elevator-car F, open at opposite ends and containing a freight-car track, an endless chain $r^5$ below the track, and a bracket $r^3$, fastened to the chain, and gear mechanism, substantially as described, laterally of the elevator-shaft where the car F is presented endwise and adjustable at will to connect the chain $r^5$ with and disconnect it from the driving power, substantially as and for the purpose set forth.

13. In an elevator having a shaft S, containing endless traveling cable-chains extending vertically in the shaft and one or more elevator-cars supported on and carried by the said cable-chains, an elevator-car F, open at opposite ends and containing a freight-car track, shafts R and R', journaled below the track and carrying pinions $r'$ and $r$, connected by an endless chain $r^5$, a bracket $r^3$, fastened to the said chain, and mechanism at each of different floors, intersected by the shaft S, for operating the endless chain $r^5$, comprising a rack $s^4$, a lever $s^2$, carrying a pinion $s^3$, and a bracket $s^7$, carrying a pinion $s'$ on a normally-rotating shaft $s$, to which the pinion $s^3$ is linked, the whole being constructed and arranged to operate substantially as and for the purpose set forth.

THOMAS J. THORP.

In presence of—
H. J. FROST,
J. N. HANSON.